United States Patent [19]

Mitcham et al.

[11] Patent Number: 4,534,235

[45] Date of Patent: Aug. 13, 1985

[54] ROTARY STEPPER ACTUATOR

[75] Inventors: John P. Mitcham, Woodlands; Michael A. Karr, Jr., Houston, both of Tex.

[73] Assignee: Gray Tool Company, Houston, Tex.

[21] Appl. No.: 547,809

[22] Filed: Nov. 1, 1983

[51] Int. Cl.³ ............................................. F16H 27/02
[52] U.S. Cl. ........................................ 74/128; 74/129; 251/230; 251/31
[58] Field of Search ................ 74/128, 129, 160, 161; 251/230, 31

[56] References Cited

U.S. PATENT DOCUMENTS

| | | | |
|---|---|---|---|
| 1,167,179 | 1/1916 | Hires | 74/129 |
| 2,808,033 | 10/1957 | Geier et al. | 74/129 |
| 3,868,861 | 3/1975 | Scholin | 74/129 |
| 4,116,216 | 9/1978 | Rosenberg | 251/230 |
| 4,126,293 | 11/1978 | Zeuner et al. | 251/31 |
| 4,280,675 | 7/1981 | Davis et al. | 74/129 |
| 4,282,720 | 8/1981 | Stottmann et al. | 74/129 |
| 4,350,054 | 9/1982 | Werth, Jr. | 74/128 |

Primary Examiner—Henry C. Yuen
Attorney, Agent, or Firm—Troxell K. Snyder

[57] ABSTRACT

A pair (20) of unidirection actuators are opposingly disposed coaxially about an elongated member (1) for controllably imparting a series of stepwise rotary movements thereto. An outer race (5) disposed within a housing (2) is rotationally reciprocated as a result of the axial reciprocation of a coaxial drive member (3) under the influence of reciprocation means (12, 15, 9). An overrunning clutch (6) converts the reciprocal rotary motion of the outer race (5) into a series of uniform unidirectional stepwise angular movements.

24 Claims, 5 Drawing Figures

ROTARY STEPPER ACTUATOR

FIELD OF THE INVENTION

The present invention relates to an actuator for controllably turning an elongated member about a central axis, and more particularly, to an actuator for turning an elongated member, such as the stem of an adjustable control valve, in a series of stepwise rotational increments.

BACKGROUND OF THE INVENTION

When finally completed and put into production, oil and gas wells located beneath the ocean or on remote platforms or other inaccessible locations are most often connected together at a common control center, and a series of flow control valves, known as chokes, are installed in the main flow line of each well to control the rate of material flow therefrom. It is desirable to provide for remote regulation of flow from each individual well by supplying each choke valve with a separate actuator capable of opening and closing the particular choke valve upon command from a remote operator.

The existence and use of such actuators is well known in the valve control art, however actuators used in subsea or other inaccessible locations for the control of producing oil or gas wells must meet particularly exacting standards. Specifically, the actuator for a subsea choke must be able to readily withstand the hostile undersea environment, which may include physical abuse, corrosive conditions, and little or no maintenance. Moreover, it is essential that the actuator be capable of selectively positioning and returning the choke to any one of a number of setpoints upon command in order to optimize the rate of production from the control well.

It is therefore an object of the actuator according to the present invention to positively rotate an elongated member, valve stem, or the like in a stepwise fashion upon the command of a remote operator.

It is a further object of the actuator according to the present invention that said stepwise motion be uniformly incremental and repeatable.

It is a still further object of the actuator according to the present invention to provide a rugged, streamlined means for rotatably positioning said elongated member, valve stem or the like.

SUMMARY OF THE INVENTION

The present invention provides a stepwise rotary actuator, for a valve stem of the like, which is compact, coaxial, and usable under extreme service conditions where substantial likelihood of physical abuse exists. The actuator includes a housing, disposed about a portion of the valve stem or other elongation member, which is secured against rotational motion by attachment to the valve bonnet or the like.

A drive member, coaxially reciprocable with the stem, is engageable with a coaxial outer race disposed between the housing and the stem. Means, operable upon engagement of the drive member and outer race, is provided for imparting a reciprocal rotary motion to the outer race upon the axial reciprocation of the drive member. An overrunning clutch, disposed between the stem and the outer race, imparts unidirection rotary motion to the stem during the reciprocal rotary motion of the outer race by engaging the valve stem against relative rotational movement between the stem and the outer race in one rotational direction and slipping freely in the other rotational direction.

A bi-directional actuator is provided, according to the present invention, by providing a pair of independently operable, opposing actuators, each adapted for turning the stem in an opposite rotational direction. During operation of one actuator in this configuration, the unengaged outer race of the inoperable actuator is free to rotate with the stem under the influence of the respective overrunning clutch.

The present invention also encompasses the use of a hydraulic actuator for imparting at least a portion of the axial reciprocal motion to the drive member.

DESCRIPTION OF THE PREFERRED AND ALTERNATE EMBODIMENTS

Figure 1:
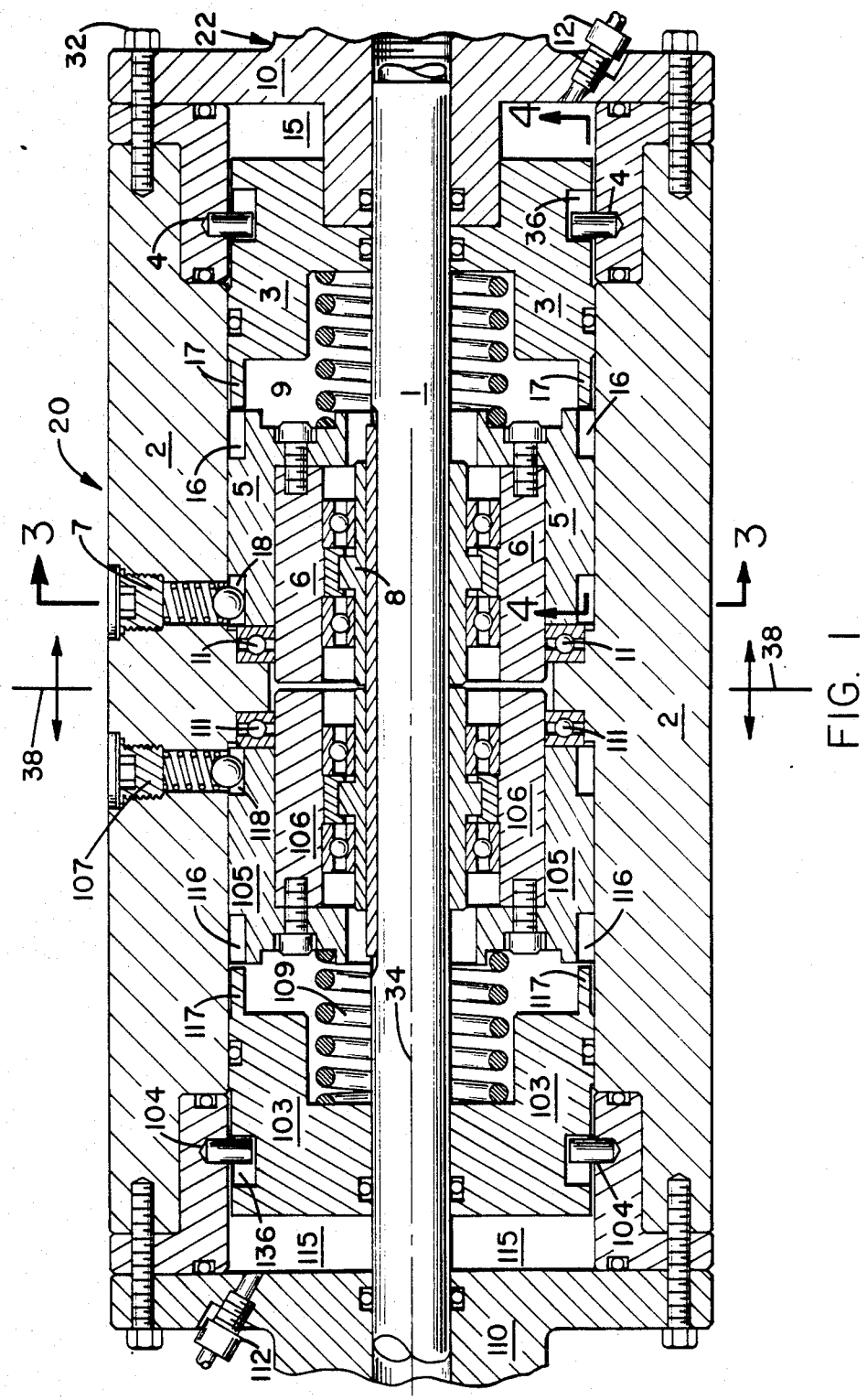
FIG. 1 shows an axial section of the bi-directional actuator according to the preferred embodiment of the present invention.
Figure 2:
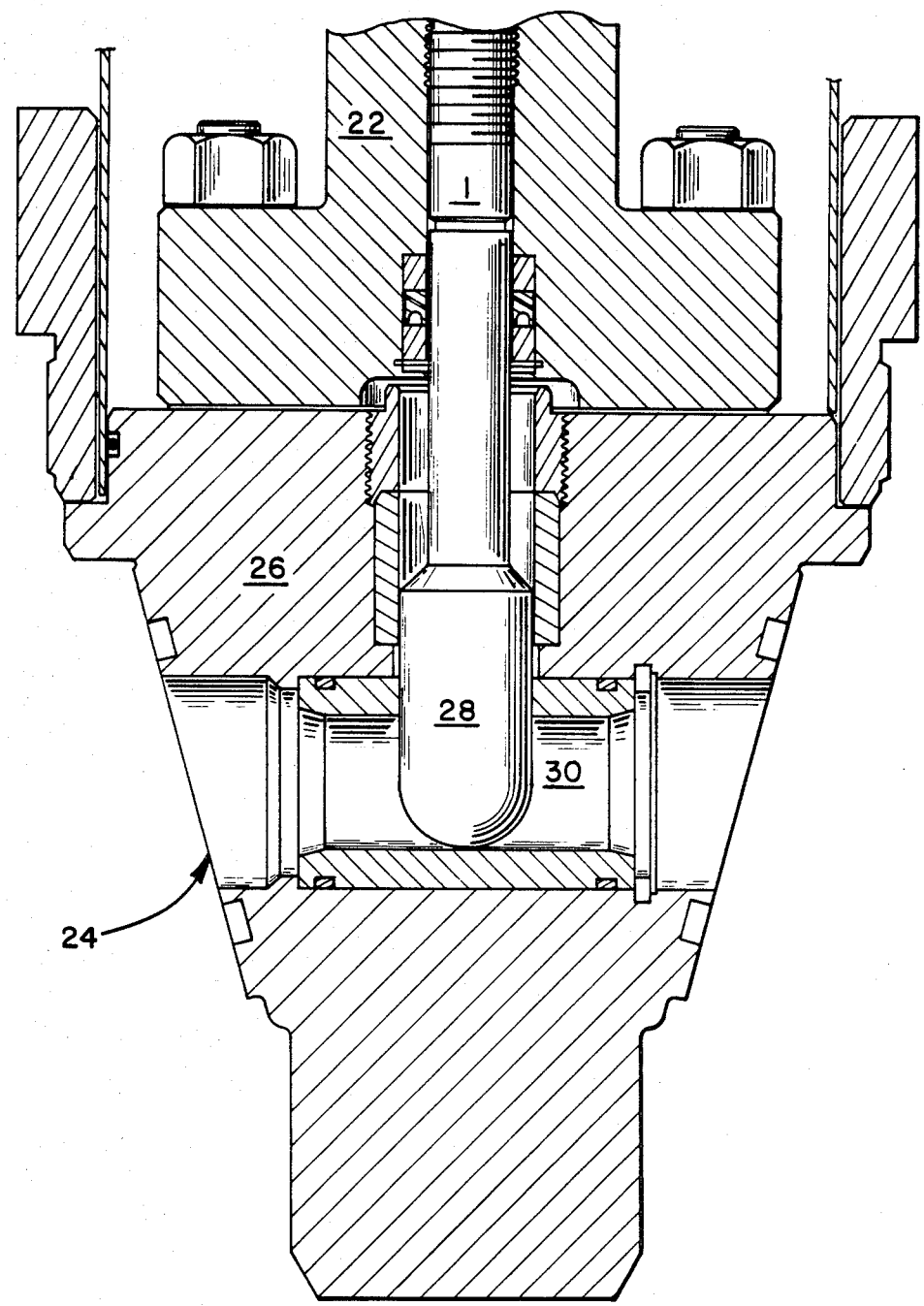
FIG. 2 shows a sectional view of a choke valve, the stem of which may be rotated by an actuator according to the present invention.

Referring generally to FIGS. 1 and 2, each of which is an extension of the other, one arrangement of the actuator according to the present invention may be envisioned. The bi-directional actuator according to the preferred embodiment of the present invention is designated generally as the assembly 20 which is shown secured to the bonnet 22 of the choke valve designated generally as 24. The choke valve 24 includes standard valve structure, including a valve body 26, a gate member 28, a valve cavity 30 and a stem 1 for actuating the gate member 28 to regulate the flow of material through the valve cavity 30. Although disclosed herein in terms of an actuator for use in moving a valve stem in a series of stepwise rotational increments, it is to be understood that the actuator according to the present invention is equally operable for rotating any of a wide variety of elongated members about the central axis thereof in a series of stepwise increments.

The actuator according to the present invention finds particular utility when used in conjunction with a choke valve in association with undersea oil production equipment by permitting the remote operator of said equipment to open or close the choke valve an incremental amount by initiating a selected number of stepwise incremental movements of the choke valve stem 1. As the structure of control valves such as that shown in FIG. 2 is well known, further disclosure of the mechanism of the apparatus actuated by rotating elongated member 1 will be limited to a statement that the actuator according to the present invention is equally well adapted to impart stepwise rotary motion to valve stems of both the rising and non-rising stem variety.

Turning particularly to FIG. 1, the actuator according to the present invention will now be described in detail. FIG. 1 shows a bi-directional actuator according to the preferred embodiment of the present invention. The bi-directional actuator is in fact comprised of two unidirectional actuators, each adapted for turning the stem 1 in an opposite rotational direction. As each actuator is identical in function to the other, and as each therefore comprises both functionally identical and structurally symmetrical components, only one actuator will be described herein in detail. The second actuator, disposed in the left-hand portion of the drawing figure, is comprised of structural members identified with reference numerals identical with those of the actuator disposed in the right-hand portion of the figure, but increased in magnitude by exactly one hundred. Thus, the description of drive member 3 in the right-hand portion of the drawing figure is equally applicable to drive member 103 in the left-hand portion of the drawing figure, save only that the structure in the left-hand portion of the drawing figure is adapted to drive the elongated member 1 in a rotational direction opposite that of the actuator shown in the right-hand portion.

Beginning with the valve bonnet 22, the actuator according to the present invention comprises a housing 2, disposed axially about at least a portion of the stem 1. The housing 2 is secured against rotational or other motion by securing means or bolts 32 as shown in FIG. 1.

Coaxially disposed in the annular space between the housing 2 and the stem 1 is a generally cylindrical outer race 5. The outer race 5 is restrained from motion along the axis 34 of the valve stem 1 by journal bearings 11 which also provide for rotational motion of the outer race 5 within the housing 2.

Disposed between the outer race 5 and the valve stem 1 is an overrunning spray clutch 6, which serves to prevent relative clockwise rotation between the outer race 5 and the valve stem 1 by establishing engagement therebetween upon attempted relative rotation in the clockwise direction. Upon attempted rotation in the counterclockwise direction, the overrunning clutch 6 allows free slippage between the outer race 5 and the stem 1. It will thus be appreciated that the outer race 5 and overrunning clutch 6 can only impart a clockwise rotational motion to the shaft 1, with any relative counterclockwise motion of the outer race 5 resulting in slippage between the overrunning clutch 6 and the valve stem 1.

For use with risng stem valves, the actuator as shown in FIG. 1 discloses the valve stem 1 as including an inner race 8, slidably secured to the valve stem 1 against rotational motion therebetween, but adapted to permit relative longitudinal translation of the stem 1 along the central axis 34.

Still referring to FIG. 1, a drive member 3 is shown coaxially disposed along the valve stem 1 and axially proximate the outer race 5. The drive member 3 is shown in FIG. 1 in a rest position, and is reciprocable from and to said rest position under the influence of reciprocating means 15, 12, and 9 as will be disclosed more fully herein below.

In the preferred embodiment of the present invention, the drive means 3 is shown as an annular piston, slidably supported in the annular space between the housing 2 and the valve stem 1. The piston 3 is reciprocable from the rest position under the influence of a hydraulic actuator shown in the preferred embodiment as comprising a pressure chamber 15 and a pressure tap 12. It will thus be appreciated that the introduction of a high pressure fluid or gas via pressure tap 12 into the pressure chamber 15 will drive the piston 3 to the left from the pictured rest position. Return spring 9, also shown in FIG. 1, is compressed by the displacement of the piston 3 from the rest position and returns the piston 3 to the rest position following depressurization of the pressure chamber 5 to complete one axial reciprocation of the piston 3.

It will further be appreciated by those skilled in the art that the disclosed combination hydraulic/spring means for reciprocating the drive member 3 in the axial direction is but one of a wide variety of means operable to provide linear reciprocal motion to such a member.

FIG. 1 further discloses means for engaging the drive member 3 and the outer race 5 only upon displacement of the drive member 3 from the rest position. The preferred embodiment of such engagement means is shown as being a plurality of drive fingers 17 disposed circumferentially about the annular piston 3 and, upon displacement of the piston 3 from the rest position, engaging corresponding drive recesses 16 disposed about the circumference of the outer race 5. It should be noted that the drive recesses 16 and the drive fingers 17 are, when the piston 3 is in the rest position, spaced apart in the axial direction, therefore permitting free relative rotation therebetween.

Upon engagement of the drive fingers 17 and the drive recesses 16, the drive member 3 and the outer race 5 are maintained in a predetermined axial orientation until the drive member 3 returns to the rest position resulting in disengagement of the engaging means 16, 17. In the preferred embodiment of the present invention, drive fingers 17 are shown extending parallel to the central axis 34 thus requiring, upon engagement with the corresponding drive recesses 16, that there be no relative axial rotation between the outer race 5 and the piston 3. In an alternative embodiment (not shown) according to the present invention, the drive fingers 17 extend helically from the drive member 3 and, upon engagement with corresponding drive recesses 16 in the outer race 5, result in relative rotational motion between the drive member 3 and the outer recess 5, depending upon the degree of axial displacement of the drive member 3 from the rest position.

In order that rotational motion be imparted to the stem 1 as a result of the axial reciprocation of the drive member 3, there must be a further means, operable upon enagement of the drive member 3 and the outer race 5 for positively imparting reciprocal rotational motion to the outer race 5. In the preferred embodiment of the present invention, wherein there is no relative rotational movement between the outer race 5 and the drive member 3 permitted upon engagement, this means must of needs impart an absolute reciprocal rotational motion to both the outer race 5 and the drive member 3. In the alternative embodiment discussed hereinabove, it is alternatively apparent that the means for imparting such reciprocal rotary motion must include structure for preventing the absolute rotational movement of the drive member 3 thereby causing the rotary reciprocation of the outer race 5 upon axial reciprocation of the helical drive fingers within the corresponding drive slots in the outer race.

Such means for establishing a particular absolute rotational orientation of the drive member 3 upon reciprocation from and to the rest position may be most effectively disposed between the non-rotatable housing 2 and the drive member 3. Such means may include a series of cooperating splines, either helical or longitudinal for the respective preferred or alternative embodiment, disposed between the drive member 3 and the housing 2. More simply, therefore preferably, as shown in FIG. 1 is a pin 4 secured to the outer housing 2 and extending radially inward therefrom, the pin being engageable in a slot 36 included in the drive member 3. In the preferred embodiment according to the present invention, the slot 36 is helical for imparting a reciprocal rotational motion to the piston 3 upon displacement from and to the rest position. Such reciprocal rotary motion of the piston 3 results, upon engagement of the engaging means 16, 17, in like reciprocal rotary motion of the outer race 5. As discussed hereinabove, the overrunning clutch 6 disposed between the outer race 5 and the stem 1 converts the reciprocal rotary motion of the outer race 5 into a unidirectional stepwise rotation of the valve stem 1 in a clockwise direction.

It will be appreciated that uniform reciprocal motion of the drive member 3 likewise results in uniform rotary reciprocation of the outer race 5 and therefore uniform incremental stepwise movement of the stem 1 in the desired direction. Such uniform motion is particularly desirable when remotely operating control valves such as the choke valve in an undersea oil producing application. An operator utilizing such a stepwise actuator is able to incrementally position the gate member 28 of such a valve 24 resulting in accurate and predictable control response.

As will be appreciated by further observance of FIG. 1, a bi-directional actuator for turning valve stem 1 is created by combining two actuators according to the present invention about a single stem 1 and within a single housing 2. The paired actuators in the bi-directional arrangement are structurally symmetrical about a centerline 38 and are each adapted to impart stepwise rotary motion to the stem 1, each in a direction opposite that of the other.

As will be further appreciated by close examination of FIG. 1, it can be seen that actuation of the left-hand actuator for causing stepwise counterclockwise rotation of the valve stem 1 will result in engagement of the overrunning clutch 6 of the right-hand actuator and therefore counterclockwise rotation of the outer race 5. Such rotation is allowable as the drive member 3 is in the rest position and therefore not engaged with the outer race 5 permitting free rotation thereof. It is also apparent that the stem 1 is free to rotate in either the clockwise or counerclockwise direction as long as drive members 3, 103 are in their respective rest positions. This is ordinarily not of concern as most valves do not require retention of the valve stem 1 in any particular rotational position, however, the actuator according to the present invention provides a detent mechanism 7, 18 shown rather sketchily in FIG. 1. In the bi-directional actuator of FIG. 1, the detents 7, 18 and 107, 118, provide both restraint on undesirable rotary motion of the valve stem 1 through opposing outer races 5, 105 and opposing overrunning clutches 6, 106, as well as providing a measure of insurance that engaging means 16, 17 and 116, 117 will be readily engageable upon displacement of the respective drive means 3, 103 from their respective rest position.

Figure 3:
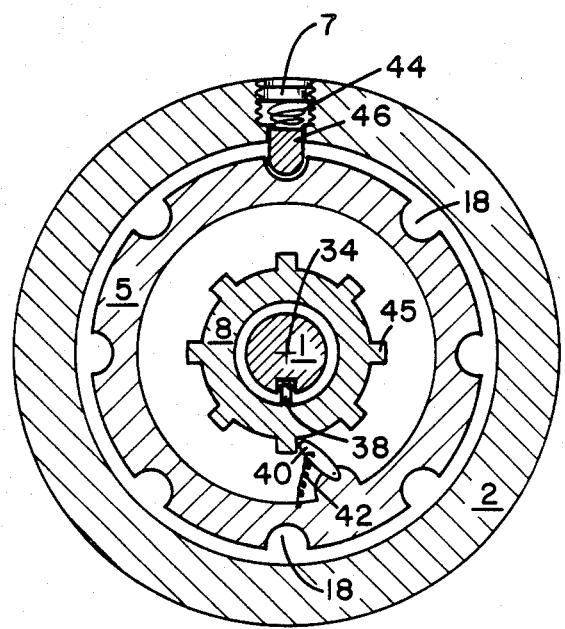
FIG. 3 shows a cross-sectional view of the preferred embodiment according to the present invention taken in a plane perpendicular to the central axis as shown in FIG. 1.

FIG. 3 is a sectional view, perpendicular to the central axis 34 as indicated in FIG. 1. The stem 1 is shown along with the inner race 8 which is keyed or splined 38 to prevent relative rotational motion therebetween while allowing relative longitudinal motion along the central axis 34, as would be reuired when using the actuator with a rising stem valve. The overrunning clutch 6 may be one of a variety of such devices well known in the art, one of which is disclosed herein as being a pivotal member 40 disposed between the inner race 8 of the stem 1 and the outer race 5. Also included is optional spring means 42 for urging the pivotal member 40 into contact with a series of protrusions 45 projecting radially outward from the inner race 8. Overrunning clutch 6 may equally well be comprised of a plurality of cam members, (not shown) disposed between the inner race 8 and the outer race 5, and adapted to grip therebetween upon attempted relative clockwise rotation.

As is well disclosed by the drawing figure, attempted relative rotation of the outer race 5 about the stem 1 and inner race 8 results in positive engagement of the pivoted member 42 with one of the protrusions 45 of the stem assembly 1, 8 thus prohibiting such clockwise relative motion. Counterclockwise rotation of the outer race 5 relative to the stem 1 and inner race 8 results in outward pivoting of the pivotal member 40 under the influence of one of the protrusions 45 on the inner race 8, resulting in slippage between the stem assembly 1, 8 and the outer race 5. To reiterate a point well disclosed above, rotary reciprocal motion of the outer race 5 results in unidirectional stepwise motion of the stem 1 by the action of the overrunning clutch 40, 42.

Detent means 7, 44, 46 is also more clearly disclosed herein as being a spring loaded member 46 shown protruding radially inward for releasably engaging one of a plurality of depressions 18 disposed circumferentially about the inner race 5. Reciprocal rotary motion of the outer race 5 caused by the interaction of the outer race 5 and the drive member 3, as disclosed hereinabove, results in displacement of the spring loaded member 46 from the current depression 18, and subsequent re-engagement upon return of the outer race 5 to the pictured position. Spring 44 and retaining nut 7, along with spring loaded member 46 and depressions 18 are but one means for providing releasable detention of the outer race 5 in one of a plurality of potential rotary positions.

By matching the reciprocal rotary motion imparted to the outer race 5 by the drive member 3 with the position of the depressions 18 in the outer race 5 and the protrusions 45 in the inner race 8, it is both possible and desirable to have an actuator wherein the detent means 46, 18 is engageable at the furthermost extent of the rotary reciprocal movement imparted to the outer race 5 by the axial reciprocation of the drive member 3. The outer race is thus moved among a plurality of equally spaced rotary index positions, either by the reciprocal motion of the corresponding drive member, or by the movement of the stem 1 by the opposing stepwise actuator via the corresponding overrunning clutch.

Figure 4:
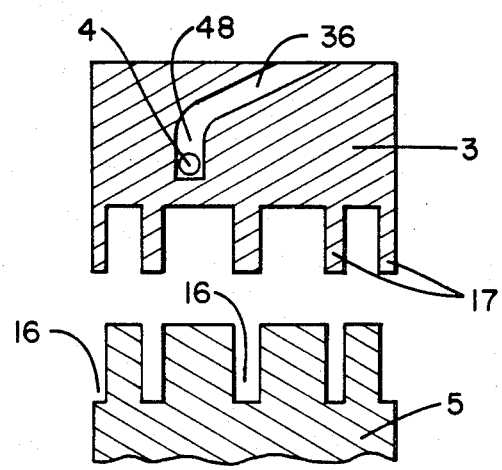
FIG. 4 shows a sectional side view of the drive piston of the preferred embodiment of the present invention in the rest position as indicated in FIG. 1.
Figure 5:
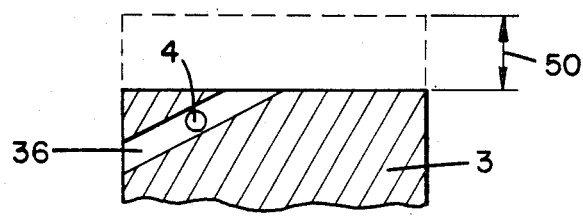
FIG. 5 shows the drive piston of FIG. 4 following full displacement of the piston from the rest position.

FIGS. 4 and 5 complete the disclosure of the preferred embodiment according to the present invention. FIG. 4 shows a cross-sectional view of the drive piston 3 and the outer race 5 as indicated on FIG. 1. Drive fingers 17 are shown extending toward the corresponding recesses 16 in the outer race 5. Pin 4 is shown engaged with helical slot 36 for imparting a reciprocal rotary motion to the drive member 3 upon displacement from the pictured rest position. One feature of the slot 36 not heretofore disclosed or discussed, is the use of a longitudinal portion 48 shown proximate the pin 4 when the drive member 3 is in the rest position. Longitudinal section 48 of the slot 36 allows a small amount of nonrotational translation of the drive member 3 upon displacement from the rest position to facilitate engagement of the drive fingers 17 with the drive recesses 16 before initiating reciprocal rotary motion of the engaged members.

FIG. 5 shows the drive member 3 according to the present invention after being fully displaced 50 from the rest position shown in phantom in the figure. Pin 4, secured to the housing 2 (not shown in this figure) in cooperation with slot 36 has imparted a relative rotational motion in the clockwise direction to the drive member 3, and will, upon reversal of the axial displacement of the drive member 3, impart a counterclockwise rotational motion thereto.

The stepwise actuator and the bi-directional stepwise actuator disclosed herein presents a compact, powerful means for turning an elongated member such as the stem of a control valve. The use of coaxial drive members disposed within an outer housing minimizes the possibility of physical damage to the actuator. Moreover, the use of a coaxial piston as in the preferred embodiment, allows hydraulic actuation of the drive member 3 with a minimum of additional structure or complicity.

It is a further feature of the actuator according to the present invention that the final drive assembly comprised of the outer race 5 and the overrunning clutch 6 be detained in one of a plurality of equally spaced rotary index positions for facilitating the engagement of the drive member 3 and the outer race 5 during operation of the actuator.

It is a still further feature of the actuator according to the present invention that, when in an inoperable state, i.e., with the drive member 3 in the rest position, the elongated member 1 and outer race 5 are freely rotatable in either direction insofar as any restraint resulting from the detaining means 46 may be considered to be negligible.

These and other advantagees and features of the unidirectional and bi-directional actuators of the present invention will be apparent to a skilled reader upon close examination of the foregoing specification and the appended claims and drawing figures.

We claim:

1. A bi-directional actuator for a valve stem for rotating said stem in a series of stepwise increments, comprising:
    a housing, surrounding a portion of said stem and secured against rotational movement;
    a first outer race, disposed within the housing and rotatably supported therewithin;
    a second outer race, disposed within the housing and rotatably supported therewithin;
    a first overrunning clutch, said clutch engageable between the first outer race and said stem upon attempted relative rotation therebetween in the clockwise direction and slipable between the first outer race and said stem upon relative rotation therebetween in the counterclockwise direction;
    a second overrunning clutch, said second clutch engageable between the second outer race and said stem upon attempted relative rotation therebetween in the counterclockwise direction and slipable between the second outer race and said stem upon relative rotation therebetween in the clockwise direction;
    a first piston, axially reciprocable within the housing from a first rest position and coaxial with the stem;
    first means, operable only upon displacement of the first piston from the first rest position, for engaging the first piston and the first outer race for preventing relative rotary motion therebetween;
    a second piston, axially reciprocable within the housing from a second rest position and coaxial with the stem;
    second means, operable only upon displacement of the second piston from the second rest position, for engaging the second piston and the second outer race for preventing relative rotary motion therebetween;
    first means for reciprocating the first piston to and from the first rest position;
    second means for reciprocating the second piston to and from the second rest position;
    first means, disposed between the first piston and the housing, for axially rotating the first piston upon displacement from the first rest position, said first rotating means imparting a clockwise rotation to the first piston upon displacement from the first rest position and a counterclockwise rotation to the first piston upon return to the first rest position; and
    second means, disposed between the second piston and the housing, for axially rotating the second piston upon displacement from the second rest position, said second rotating means imparting a counterclockwise rotation to the second piston upon displacement from the second rest position and a clockwise rotation to the second piston upon return to the second rest position, whereby reciprocation of the first piston within the housing imparts a reciprocal rotary motion to the outer race and, through the first overrunning clutch, a stepwise clockwise rotation to said stem, and whereby reciprocation of the second piston within the housing imparts reciprocal rotary motion to the second outer race and, through the second overrunning clutch, a stepwise counterclockwise rotation to said stem.

2. The bi-directional actuator of claim 1, wherein;
    the first piston further includes a first helical slot disposed within the first piston and the first means for axially rotating the first piston includes a first pin secured within the housing and extending radially inward therefrom, said first pin engageable with the first helical slot for requiring the first piston to rotate in a clockwise direction upon axial displacement of the first piston from the first rest position; and
    the second piston further includes a second helical slot disposed in the second piston, and the second means for axially rotating the second piston includes a second pin secured within the housing and extending radially inward therefrom, said second pin engageable with the second helical slot for requiring the second piston to rotate in a counterclockwise direction upon axial displacement from the second rest position.

3. A bi-directional actuator of claim 2, wherein the first and second means for engaging the respective first and second pistons and first and second outer races includes:
    a plurality of drive fingers, secured to each piston, and a plurality of corresponding drive recesses, disposed in each respective outer race, the drive fingers and drive recesses being spaced apart when the respective pistons are in the respective rest positions and being respectively axially slidably engaged upon displacement of the respective piston from the respective rest position.

4. The bi-directional actuator of claim 1, further comprising:
   means for incrementally detaining the first outer race in one of a plurality of rotational index positions, each index position corresponding to the furthermost extent of the reciprocal rotary motion imparted to the first outer race by the reciprocal motion of the first piston; and
   a second means for detaining the second outer race in one of a plurality of index positions, each index position corresponding to the furthermost extent of the reciprocal rotary motion imparted to the second outer race by the reciprocal axial motion of the second piston.

5. The bi-directional actuator of claim 4, wherein the first and second means for detaining the respective first and second outer races in one of a plurality of index positions each further comprises:
   a plurality of recesses disposed circumferentially about each outer race, each recess corresponding to a single index position; and
   first and second spring loaded members, each respectively engageable with one of the plurality of recesses in the respective first and second outer races, for releasably holding each respective first and second outer race in one respective index position.

6. An actuator for imparting unidirectional stepwise rotary motion to an elongated member about a central axis, comprising:
   a housing, surrounding a portion of the elongated member and secured against rotary motion;
   an outer race, disposed within the housing and rotatably supported therewithin;
   an overrunning clutch, said clutch engageable between the outer race and the elongated member upon attempted relative rotation therebetween in the clockwise direction, and slippable between the outer race and the elongated member upon relative rotation therebetween in the counterclockwise direction;
   a drive member, axially reciprocable from and to a rest position and coaxial with the elongated member;
   means, operable only upon displacement of the drive member from the rest position, for engaging the drive member and the outer race for establishing a predetermined relative rotational orientation between the drive member and the outer race during the engagement thereof;
   means for reciprocating the drive member from and to the rest position; and
   means, operable upon engagement of the drive member and the outer race, for imparting a clockwise rotary motion to the outer race upon displacement of the drive member from the rest position, and a counterclockwise rotary motion to the outer race upon return of the drive member to the rest position.

7. The actuator of claim 6, further comprising means, disposed between the housing and the outer race, for releasably holding the outer race in any one of a plurality of equally spaced rotary positions, said positions corresponding to the farthermost movement imparted to the outer race by one reciprocation of the drive means.

8. The actuator of claim 6, wherein the overrunning clutch includes a pivotal member, disposed between the outer race and the elongated member, said pivotal member being engageable with the elongated member for preventing a relative clockwise rotation between the outer race and the elongated member.

9. A bi-directional actuator for an elongated member having a longitudinal central axis, comprising:
   first and second unidirectional actuators, each according to claim 1, said first and second actuators further being disposed one opposite the other for causing bi-directional stepwise rotation of the elongated member.

10. The actuator of claim 6, wherein the means for reciprocating the drive member includes:
    a hydraulic actuator for axially displacing the drive member from the rest position; and
    a spring, compressible by the axial displacement of the drive member from the rest position, for urging the drive member back to the rest position upon depressurization of the hydraulic actuator.

11. The actuator of claim 10, further comprising means, disposed between the housing and the outer race, for releasably holding the outer race in any one of a plurality of equally spaced rotary positions, said positions corresponding to the farthermost movement imparted to the outer race by one reciprocation of the drive means.

12. The actuator of claim 6, wherein the drive member is a piston, disposed coaxially with the elongated member and within the housing and wherein the means for engaging the drive member and outer race includes,
    a plurality of drive fingers secured to the piston and extending axially therefrom; and
    a plurality of drive recesses, disposed in the outer race and corresponding to the drive fingers, said drive recesses and said drive fingers being axially spaced apart when the piston is in the rest position, and being engaged for the prevention of relative rotational movement between the outer race and the piston when the piston is displaced from the rest position.

13. The actuator of claim 12, wherein the overrunning clutch includes a pivotal member, disposed between the outer race and the elongated member, said pivotal member being engageable with the elongated member for preventing a relative clockwise rotation between the outer race and the elongated member.

14. The actuator of claim 6, wherein the drive member further includes a slot disposed in the piston and the means for imparting a rotary motion to the outer race includes a pin, secured within the housing and extending radially inward therefrom, said pin engageable with the slot in the drive member for determining a relative rotational position of the drive member with respect to the housing when the drive member is displaced from the rest position.

15. The actuator of claim 14, wherein the slot in the drive member is a helical slot for requiring the clockwise rotation of the drive member upon displacement from the rest position and for requiring counterclockwise rotation of the drive member upon return to the rest position.

16. The actuator of claim 14, wherein the means for reciprocating the drive member includes:
    a hydraulic actuator for axially displacing the drive member from the rest position; and a spring, compressible by the axial displacement of the drive member from the rest position, for urging the drive member back to the rest position upon depressurization of the hydraulic actuator.

17. The actuator of claim 14, further comprising means, disposed between the housing and the outer race, for releasably holding the outer race in any one of a plurality of equally spaced rotary positions, said positions corresponding to the farthermost movement imparted to the outer race by one reciprocation of the drive means.

18. The actuator of claim 14, wherein the overrunning clutch includes a pivotal member, disposed between the outer race and the elongated member, said pivotal member being engageable with the elongated member for preventing a relative clockwise rotation between the outer race and the elongated member.

19. The actuator of claim 15, wherein the means for reciprocating the drive member includes:
a hydraulic actuator for axially displacing the drive member from the rest position; and
a spring, compressible by the axial displacement of the drive member from the rest position, for urging the drive member back to the rest position upon depressurization of the hydraulic actuator.

20. The actuator of claim 15, wherein the drive member is a piston, disposed coaxially with the elongated member and within the housing and wherein the means for engaging the drive member and the outer race includes,
a plurality of drive fingers secured to the piston and extending axially therefrom; and
a plurality of drive recesses, disposed in the outer race and corresponding to the drive fingers, said drive recesses and said drive fingers being axially spaced apart when the piston is in the rest position, and being engaged for the prevention of relative rotational movement between the outer race and the piston when the piston is displaced from the rest position.

21. The actuator of claim 15, wherein the overrunning clutch includes a pivotal member, disposed between the outer race and the elongated member, said pivotal member being engageable with the elongated member for preventing a relative clockwise rotation between the outer race and the elongated member.

22. The actuator of claim 19, wherein the drive member is a piston, disposed coaxially with the elongated member and within the housing and wherein the means for engaging the drive member and the outer race includes,
a plurality of drive fingers secured to the piston and extending axially therefrom; and
a plurality of drive recesses, disposed in the outer race and corresponding to the drive fingers, said drive recesses and said drive fingers being axially spaced apart when the piston is in the rest position, and being engaged for the prevention of relative rotational movement between the outer race and the piston when the piston is displaced from the rest position.

23. The actuator of claim 22, further comprising means, disposed between the housing and the outer race, for releasably holding the outer race in any one of a plurality of equally spaced rotary positions, said positions corresponding to the farthermost movement imparted to the outer race by one reciprocation of the drive means.

24. The actuator of claim 22, wherein the overrunning clutch includes a pivotal member, disposed between the outer race and the elongated member, said pivotal member being engageable with the elongated member for preventing a relative clockwise rotation between the outer race and the elongated member.

* * * * *

UNITED STATES PATENT AND TRADEMARK OFFICE
CERTIFICATE OF CORRECTION

PATENT NO. : 4,534,235
DATED : August 13, 1985
INVENTOR(S) : John P. Mitcham et al It is certified that error appears in the above—identified patent and that said Letters Patent is hereby corrected as shown below:

Column 10, Line 12, change "1" to --6--.

Signed and Sealed this

Sixth Day of May 1986

[SEAL]

Attest:

DONALD J. QUIGG

*Attesting Officer*   *Commissioner of Patents and Trademarks*